G. O. LEOPOLD.
COMBINED POWER AND HAND DRIVING MECHANISM.
APPLICATION FILED JAN. 28, 1916.

1,188,288.

Patented June 20, 1916.
2 SHEETS—SHEET 2.

Inventor-
George O. Leopold
by his Attorneys

UNITED STATES PATENT OFFICE.

GEORGE O. LEOPOLD, OF PHILADELPHIA, PENNSYLVANIA, ASSIGNOR TO NORTH BRO'S. M'F'G CO., OF PHILADELPHIA, PENNSYLVANIA, A CORPORATION OF PENNSYLVANIA.

COMBINED POWER AND HAND DRIVING MECHANISM.

1,188,288.   Specification of Letters Patent.   Patented June 20, 1916.

Application filed January 28, 1916.   Serial No. 74,901.

*To all whom it may concern:*

Be it known that I, GEORGE O. LEOPOLD, a citizen of the United States, residing in Philadelphia, Pennsylvania, have invented certain Improvements in Combined Power and Hand Driving Mechanism, of which the following is a specification.

This invention relates to certain improvements in power driven drilling machines of the bench type, *i. e.*, machines of a comparatively small size which are driven by power.

One object of the invention is to provide means for driving the machine by power without the use of counter shafts and shifting mechanism connected therewith.

A further object of the invention is to provide a clutch which will either connect the driven pulley to the shaft of the machine and release the handle, or connect the handle and release the pulley.

A further object of the invention is to construct the machine so that, when the mechanism is in gear, the handle will be loose and will remain in a fixed position.

A still further object of the invention is to provide a guard for the belt carried by the hand mechanism.

Figure 1:
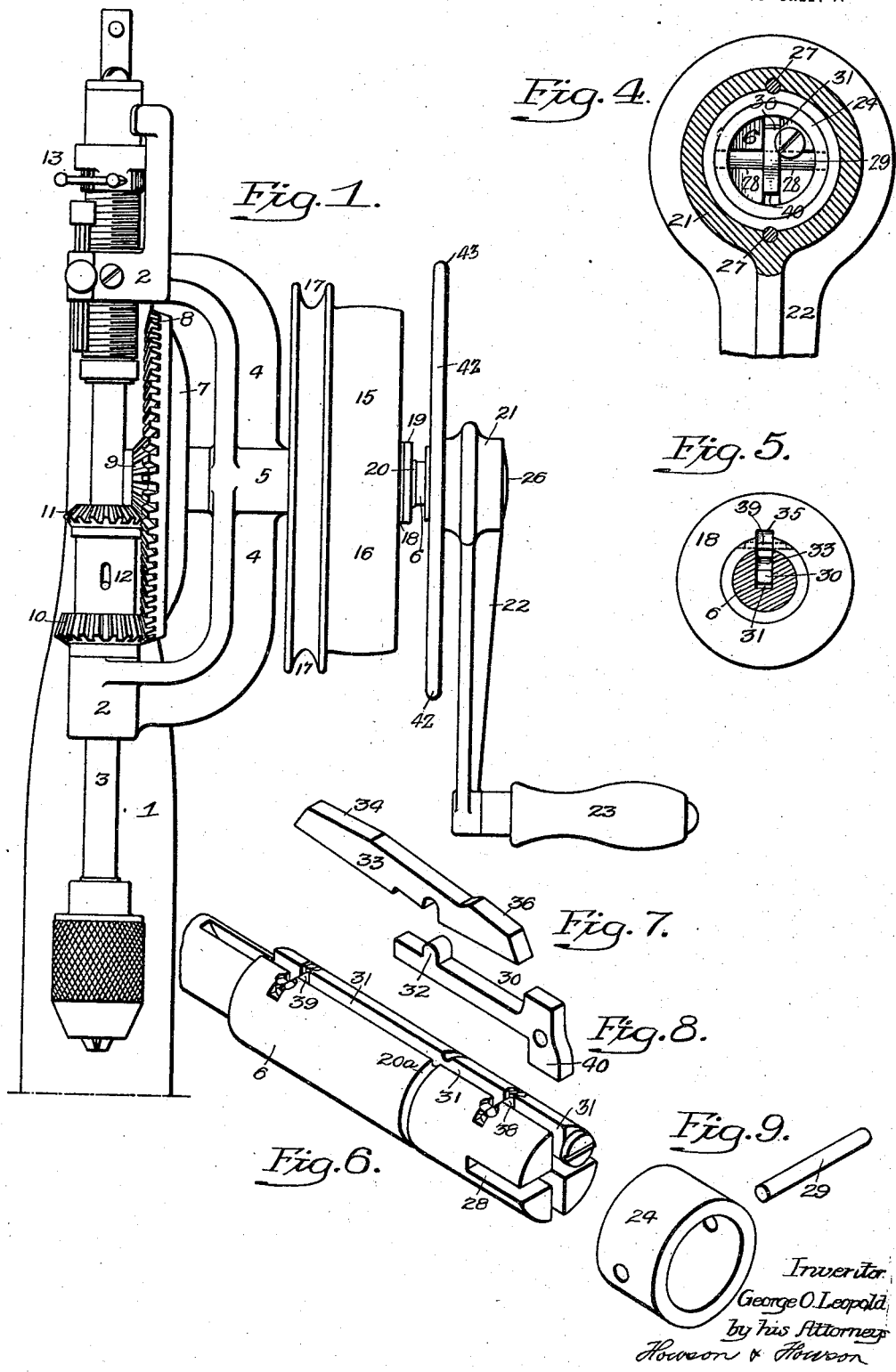
Figure 2:
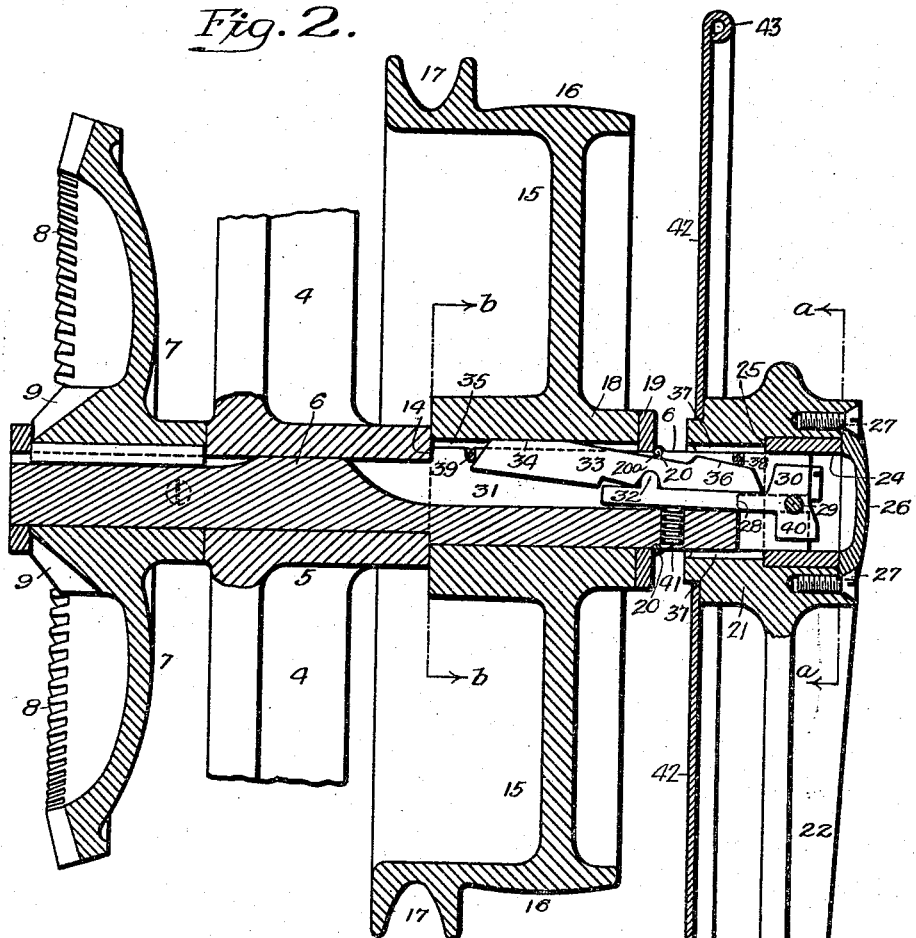
Figure 3:
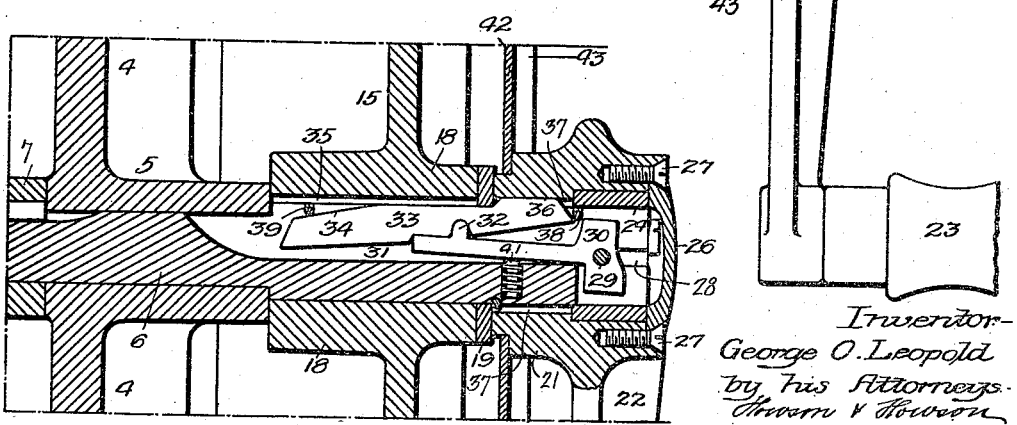

In the accompanying drawings:—Figure 1, is a side view of the upper portion of a bench drilling machine; Fig. 2, is a sectional elevation of a portion of the machine, showing the driving mechanism, the power pulley being locked to the shaft of the machine and the hand mechanism being loose thereon; Fig. 3, is a view, similar to Fig. 2, showing the power pulley loose on the shaft and the hand mechanism locked to the shaft; Fig. 4, is a sectional view on the line *a—a*, Fig. 2; Fig. 5, is a sectional view on the line *b—b*, Fig. 2; Fig. 6, is a detached perspective view of one end of the shaft, showing the slot in which the clutch mechanism is mounted; Fig. 7, is a perspective view of the clutch lever; Fig. 8, is a perspective view of the lever carrier; and Fig. 9, is a detached perspective view of the sleeve to which the carrier is pivoted.

Referring to the drawings, 1 is the frame of the drilling machine having bearings 2 for the spindle 3. 4 is a bracket projecting from these bearings and carrying the bearing 5 for the driving shaft 6 on which is a gear wheel 7 having two sets of teeth 8 and 9 arranged to mesh respectively with the pinions 10 and 11 on the spindle 3. Clutch mechanism 12 is provided for engaging either one of the pinions on the spindle 3. 13 is the feed mechanism for the spindle.

The above described mechanism forms no part of the present invention.

The driving shaft 6 projects beyond the end of the bearing 5 and has a shoulder 14, the gear wheel 7 and the shoulder holding the shaft against longitudinal movement. Loosely mounted on the shaft is the power pulley 15 having a face 16 for a flat belt and a groove 17 for a round belt, so that either type of belt can be used. At the end of the hub 18 of the pulley 15 is a washer 19 held in place by a ring 20 adapted to a groove 20ᵃ in the shaft 6. On the projecting end of the shaft 6 is mounted the hub 21 having an arm 22 carrying a handle 23, and within the hub is a sleeve 24 which is mounted on the end of the shaft 6. This sleeve is held between a shoulder 25 in the hub and a cap plate 26, secured to the hub by screws 27, so that the sleeve must move longitudinally with the hub, but is free as regards rotary movement in order that the hub and its handle will hang free against rotation when not clutched to the shaft.

The end of the shaft 6 is slotted, as at 28, and extending through the slot 28 and into the sleeve is a pivot pin 29.

Mounted on the pivot pin is a carrier 30, Fig. 8, which is located in the longitudinal slot 31 in the shaft 6 which, in the present instance, is at right angles to the slot 28. On this carrier is a projection 32 on which is pivotally mounted the clutch lever 33 having a portion 34 arranged to enter a slot 35 in the hub of the power pulley 15 and a portion 36 arranged to enter a slot 37 in the hub 21 carrying a handle 23. Each end of this clutch lever is beveled, as shown, and extending across the slot 31 are bars 38 and 39.

When the handled hub 21 is drawn out, as in Fig. 2, the carrier 30 is moved longitudinally with it. The enlarged portion 40 of this carrier is located in the slot 31, as well as the narrow portion. The carrier must turn with the shaft. This also causes the sleeve 24 to turn. The clutch lever, being located in the slot 31, is shifted to the position shown in Fig. 2, with the portion 34 extending into the slot 35 of the pulley 15, while the portion 36 is carried under the cross bar 38, being held out of engagement with the hub 21. A coiled spring 41 is located in a recess in the bottom of the slot 31 and bears against the under side of the carrier 30, tending to lift the carrier and the clutch lever so that while the parts are rigid when in engagement, they can be readily shifted, due to the yielding of the spring.

In the position above described and as shown in Fig. 2, the shaft is driven by the power pulley, while the handled hub hangs loosely without turning the handle, being of sufficient weight to overcome the friction of the sleeve in the hub so that there is no danger of the handle striking the operator when the power mechanism is in gear, but, when the handled hub is forced in toward the pulley 15, as in Fig. 3, the carrier 30 is moved longitudinally, causing the clutch lever 33 to pass under the cross bar 39, withdrawing the portion 34 from the slot 35 and forcing the portion 36 into the slot 37 of the handled hub 21. In this position, the power pulley 15 is loose on the shaft, while the shaft can be driven by hand on turning the handled hub 21.

On the hub 21 is a disk 42, preferably provided with a rounded flange 43 at its periphery. This disk is of a greater diameter than the pulley 15 and acts as a guard against accidents, as the operator must grasp either the hub or the handle to force the hub toward the pulley so that it will assume the position illustrated in Fig. 3, or withdraw the hub so that it will assume the position illustrated in Fig. 2, and by providing this disk the operator is not liable to accidentally project his fingers between the belt and the pulley.

In the drawings I have illustrated the handled hub 21 as provided with two grooves 37, but it will be understood that the hub may be provided with one groove, or may be provided with more than two grooves, as desired.

By the above described apparatus it will be understood that the drilling machine can be driven either by power or by hand, and that, when the machine is driven by power, the hub and its handle are at rest and, by simply moving the handled hub longitudinally, the shaft can be connected or disconnected from the power mechanism. This construction dispenses entirely with counter shafts and the ordinary shifting mechanism.

I claim:—

1. The combination in driving mechanism, of a shaft; a pulley loose on the shaft and having a slotted hub; a handled hub loose on the shaft and having a slot therein, the said shaft having a longitudinal groove; a carrier mounted in the groove and controlled longitudinally by the handled hub; a clutch lever pivotally mounted on the carrier; and means for shifting the lever as it is moved longitudinally so that the said lever will enter either the groove in the hub of the power pulley or the groove in the handled hub.

2. The combination of a shaft having a long slot therein; a short slot at right angles to the long slot; a pulley loose on the said shaft; a handled hub loose on the said shaft; a sleeve loosely mounted in the handled hub and having a transverse pin extending through the short slot in the end of the shaft; a carrier mounted on the pin and located in the long slot of the shaft; a clutch lever pivotally mounted on the carrier; and cross bars on the shaft extending across the long slot and arranged to shift the clutch lever as it is moved longitudinally on the movement of the handled hub.

3. The combination of a shaft having a long slot therein; a short slot at the end of the shaft and at right angles to the long slot; a sleeve encircling the end of the shaft; a pin secured to the sleeve and extending transversely through the slot; a carrier pivotally mounted on the pin and located in the long slot, said carrier having a projection; a clutch lever pivotally mounted on the said projection; cross bars extending across the long slot and arranged to tilt the clutch lever on the carrier as the carrier is moved longitudinally; a handled hub mounted on the sleeve and coupled thereto so that the sleeve will move longitudinally with the hub and will be free to turn therein; and a loose pulley mounted on the shaft, the hub of the pulley and the handled hub being slotted and adapted to receive the projecting portions of the clutch lever.

4. The combination of a shaft; a bearing therefor; a loose pulley mounted on the shaft beyond the bearing; a handled hub located on the outer end of the shaft beyond the pulley, said shaft having a long slot therein and having a short slot at its end at an angle to the long slot; a sleeve confined longitudinally to the handled hub and mounted on the end of the shaft; a pin secured to the sleeve and extending through the short slot in the shaft so that the sleeve must turn with the shaft at all times; a carrier pivoted to the pin and having a wide portion located in the end of the long slot and having a narrow portion extending into the slot; a clutch lever located within the long slot and pivotally mounted on the carrier; two cross bars extending across the slot in the shaft; the ends of the clutch lever being beveled so that on moving the handled hub longitudinally the clutch lever will be tilted; and a spring located under the carrier; the belt pulley and the handled hub each being slotted to receive the clutch lever so that, when the handled hub is drawn out, the said shaft will be in engagement with the pulley and, when forced in, the handled hub will be in engagement with the shaft and the pulley will be loose thereon.

5. The combination of a shaft; a power driven pulley loosely mounted on the shaft; a handled hub, also mounted on the shaft; clutch mechanism actuated by the handled hub so as to throw either the pulley or the hub into engagement with the shaft; and a guard disk of greater diameter than the pulley mounted on the handled hub.

6. The combination of a shaft; a driving pulley loose thereon; a handled hub loosely mounted on the shaft; a sleeve mounted on the shaft and arranged to turn therewith and to turn loosely on the handled hub, the said hub having an internal shoulder against which the end of the sleeve rests; a detachable cap bearing against the opposite end of the sleeve to hold the sleeve in the hub so that it will be moved longitudinally therewith; and clutch mechanism connected to the sleeve and arranged to engage either the power pulley or the handled hub by moving the hub longitudinally on the shaft.

GEORGE O. LEOPOLD.

Copies of this patent may be obtained for five cents each, by addressing the "Commissioner of Patents, Washington, D. C."